Jan. 14, 1941. R. W. GRISWOLD, 2D 2,229,020
AIRPLANE
Filed Oct. 28, 1938
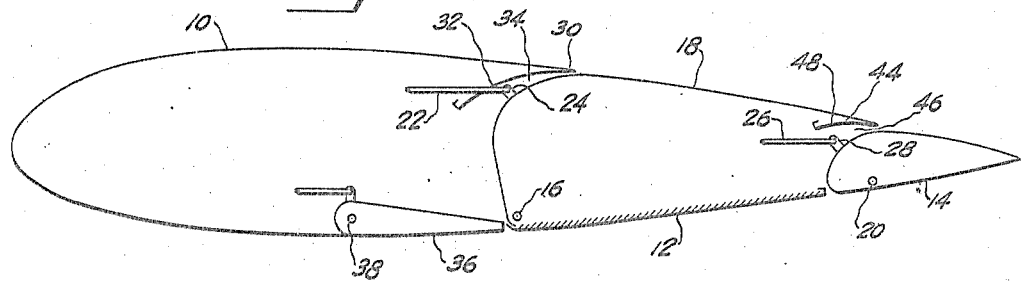
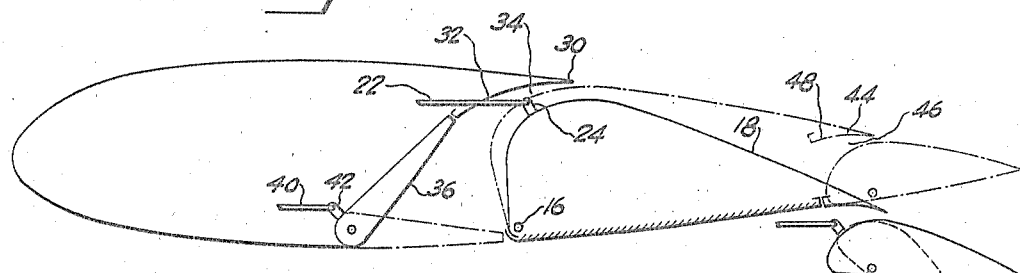
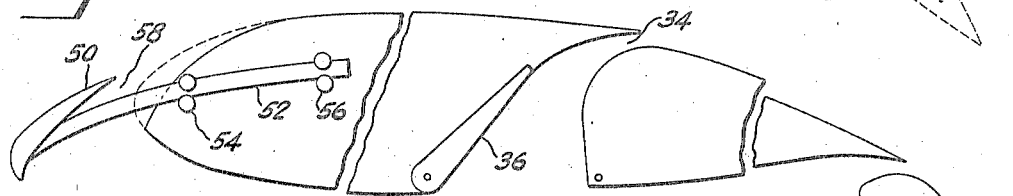
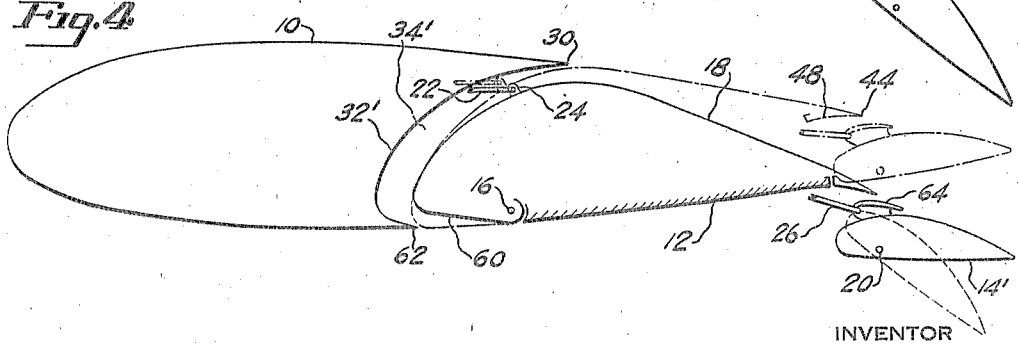
INVENTOR
Roger W. Griswold II
BY Harris G. Luther
ATTORNEY Patented Jan. 14, 1941

2,229,020

UNITED STATES PATENT OFFICE 2,229,020

AIRPLANE

Roger W. Griswold, II, Old Lyme, Conn., assignor to United Aircraft Corporation, East Hartford, Conn., a corporation of Delaware Application October 28, 1938, Serial No. 237,453

13 Claims. (Cl. 244—42)

This invention relates to improvements in airplanes and has particular reference to a high-lift construction for an airplane wing.

An object of the invention resides in the provision of an improved airplane wing construction by means of which the wing may be changed from a substantially normal basic profile low-drag condition suitable for high-speed flight to a multiple slot airfoil arrangement, sometimes called a cascade of airfoils, to provide unusually high lift in the lower end of the speed range, as required for take-off and landing at reasonably safe speeds, especially with heavily loaded aircraft.

A further object resides in the provision of an improved high-lift airplane wing construction embodying means for delaying the stall or burble of the airflow over the upper surface of the wing when the wing is in its high-lift condition and the relative airspeed is comparatively low.

Other objects and advantages will be more particularly pointed out hereinafter or will become apparent as the description proceeds.

In the accompanying drawing, in which like reference numerals are used to designate similar parts throughout, there is illustrated, by way of example, a form of high-lift airplane wing constructed according to the invention, and a slightly modified form of airplane wing constructed according to the invention. The drawing, however, is for the purpose of illustration only and is not to be taken as limiting or restricting the scope of the invention as set forth in the accompanying claims.

In the drawing, Fig. 1 is a partly schematic sectional view of an airplane wing constructed according to the invention when the wing is in its normal lift and minimum drag condition.

Fig. 2 is a view similar to Fig. 1 showing the positions of the various portions of the wing when the wing is in a high-lift condition.

Fig. 3 is a view similar to Fig. 2 showing a slightly modified form of airplane wing constructed according to the invention and, Fig. 4 is a sectional view similar to Fig. 2 showing a still further modified form of the invention.

Referring to the drawing in detail, the airfoil section of the wing as illustrated in Fig. 1 is a form primarily designed for relatively low-drag and high cruising speeds. Such a form provides ample lift for sustaining the airplane while in a high-speed flight condition but, if unchanged, would necessitate an excessively high landing speed and a long, relatively flat, high-speed glide to avoid stalling of the airplane while landing.

In modern types of airplanes with clean lines and heavy wing loadings, landing speeds have become dangerously high and various means have been provided to increase the lift of the airplane wing for landing. These means, in general, may take the form, among others, of movable flaps of airfoil section, located at or near the rear edge of the wing, or the leading edge slot arrangement, located at the front or leading edge of the wing.

While such movable flaps have proven to be highly useful in reducing landing speeds and also, in some cases, improving the performance during take-off or other maneuvers, they are inherently limited as to the ultimate values of lift and type of stalling characteristics obtainable therewith, which renders them unsuitable to cope with certain high performance design requirements. As is well known, to those skilled in the art, the lift of an aircraft wing is principally a function of its profile section characteristics, the more important of which from the high-lift standpoint, are the camber, thickness ratio, and flow control ability as determined by the position of maximum camber along the wing chord, leading edge ratios etc. It is, of course, apparent that when the flow over the upper surface of an airfoil is no longer controlled, i. e. after the airfoil has stalled, further increase in lift is terminated, abruptly so with certain profile sections. Flapped airfoils increase maximum lifts by reason of the increased camber, but suffer from the same high-lift limitations as plain wings, though at a higher value of lift, when the upper surface flow breaks down. Wings of the slotted type, however, by reason of the re-energizing of the high velocity upper surface flow, have extended flow control characteristics and thus maximum lifts, particularly with the leading edge type of slot and the slotted deflector flap. It is also well known that when the maximum camber of the airfoil is located approximately at the mid-chord position, the stalling characteristics of the wing are vastly improved, giving what is known as a smooth, rounded peak to the lift curve, rather than the sudden break or vicious stall, characteristic with many airfoils including certain so called modern types. The present invention offers a new and improved lift-increasing arrangement by providing means to overcome the limitations inherent in the prior art. These means, as will be apparent from the following specification, drawing and claims, employ the high-lift principles of high camber and appropriate location of its maximum value plus re-energizing wing slots for flow control.

The wing, as illustrated in the accompanying drawing, has a relatively fixed forward portion 10 extending rearwardly from the leading edge to approximately one-half of the chord length of the wing. This portion of the wing preferably includes the main wing supporting spars and braces and is rigidly secured to the body portion such as the hull or fuselage of the airplane. The under portion of the wing immediately to the rear of the fixed portion 10, as indicated by the numeral 12, is secured to the fixed front portion 10 or to the airplane body portion in such a manner that it is also substantially fixed relative to the body portion and forward portion 10 of the wing. This fixed under portion 12 extends rearwardly from a point approximately at the midlength of the wing chord to a location adjacent to the forward or leading edge of a movable trailing edge wing flap 14. The upper portion of the wing overlying the fixed under portion 12 is pivotally mounted about a hinge point 16 and is movable from the neutral position illustrated in Fig. 1 to the maximum lift-increasing position shown in full lines in Fig. 2. This movable upper wing portion 18 carries the hinge or pivot 20 of the trailing edge flap 14 and is movable about the pivot 16 by some suitable means which may include a line 22 pivotally connected to an apertured lug 24 secured to the upper forward portion of the movable member 18. The flap 14 is independently movable about the pivot 20 by suitable means which may include a link member 26 pivotally connected to an apertured lug 28 projecting from the upper forward portion of the flap.

From the above description it is apparent that the movable portion 18 may be pivoted about the hinge point 16 to change the camber of the upper surface of the wing from that illustrated in Fig. 1 to the camber illustrated in Fig. 2 and that when so moved the portion 18 carries the trailing edge flap 14 from the upper or neutral position illustrated in Fig. 1 to the lower position illustrated in Fig. 2 in which the flap becomes an external airfoil positioned below the undersurface of the remainder of the wing, the overall combination forming three highly cambered airfoils of successively greater incidence, having two re-energizing wing slots interposed therebetween. It is also apparent that in any position of the member 18 the flap 14 may be independently tilted about its own pivot point 20 to further increase the mean camber of the multiple airfoil cascade and to add its lift-increasing effect in any desired degree within the limitations of such external airfoil flaps, to the wing.

The upper rear portion of the fixed wing portion 10 is extended in the form of a thin wedge 30 overlying the forward upper portion of the member 18 and includes a curved shield member 32 within the wing, constituting one wall of an upwardly and rearwardly tapered wing slot the exit end of which is open when the member 18 is moved downwardly. When the wing is in its neutral condition the bottom opening of the airflow slot 34 may be closed by a movable door member 36 mounted on a pivot hinge 38 secured to the fixed wing structure. When the member 18 is moved downwardly to open the upper or exit end of the slot 34 the door member 36 may be inclined upwardly from the position illustrated in Fig. 1 to the position shown in full lines in Fig. 2 to open the lower end of the slot 34 and at the same time constitute a portion of the forward wall of the slot. The slot 34 is so shaped that the air flowing through the slot from the high air pressure area below the wing to the relatively low pressure area above the wing is directed along the upper surface of the member 18 to aerodynamically re-energize this surface when the member 18 is in its lowermost position as illustrated in Fig. 2. The door 36 is moved by suitable means which may include a link member 40 pivotally secured to an apertured lug 42 projecting from the inner surface of the door member, and the door member may be independently operated, if desired, or may be automatically opened in conjunction with the lowering of the movable member 18 in a manner generally similar to that shown in Griswold application Serial No. 84,908 filed June 12, 1936, which matured into United States Patent No. 2,169,416 on August 15, 1939. When such members as 18 and 36 are dependently operated they may be interconnected so that the aerodynamic forces acting upon each tends to balance the similar forces acting upon the other.

The rear edge of the movable member 18 is also formed to have a relatively thin wedge shaped section 44 overlying the upper forward portion of the flap 14 to provide a wing slot 46 between the curved shield member 48 and the adjacent portion of the forward upper surface of the flap 14. As the flap 14 is carried by the movable member 18 the slot between the shield 48 and the adjacent surface of the flap 14 will be maintained at all positions of the member 18. Also since the member 18 inclines downwardly when pivoted about the hinge pivot 16 to its lower or lift-increasing position, the inclination of the shield member 48 will be changed to direct the air jet flowing through the slot 46 along the upper surface of the flap 14 even when the flap is drastically inclined as shown in dotted lines in Fig. 2. If desired a deflector plate of the type shown in Patent Number 2,117,607 issued May 17, 1938, to Roger W. Griswold, II may also be used.

From the above description it is apparent that there has been provided an airplane wing construction by means of which the form of the wing may be changed from a substantially continuous airfoil section of extremely low drag and slight camber to a high-lift combination of airfoils having large camber and two spaced wing slots for re-energizing the upper surfaces of said airfoils.

If desired the portion of the wing upper surface between the leading edge of the wing and the exit of the forwardly disposed wing slot 34 may also be re-energized by a suitable leading edge slot arrangement as shown in Fig. 3. In this construction a movable leading edge slot member 50 is carried by some suitable means such as the slidable struts, as indicated at 52, mounted in the spaced roller pairs, as indicated at 54 and 56, secured to the fixed structure within the forward portion of the wing. By some suitable mechanism, not illustrated, for example as is shown in Patent Number 1,780,838 issued November 4, 1930, to F. H. Page, the struts 52 may be moved to project their forward ends out of and beyond the leading edge of the wing to carry the slot member 50 to a position in which it provides a wing slot 58 between the undersurface of the slot member and the adjacent upper portion of the wing. When retracted the slot member 50 rests upon the upper forward portion of the wing surface and provides a portion of the streamlined wing leading edge as shown in dotted lines in Fig. 3. By means of the arrangement shown in Fig. 3, which includes the double slot construction illustrated in Figs. 1 and 2, and in addition a leading edge slot, the entire upper surface of the wing may be maintained aerodynamically energized even though the wing camber is increased to the extreme high-lift condition obtained by tilting the member 18 and inclining the trailing edge flap 14. By thus maintaining the upper surface of the wing aerodynamically energized to delay stalling or burbling of the airflow over the upper surface to a relatively high angle of incidence and simultaneously radically increasing the camber of the wing a large wing lift-increasing effect may be obtained.

In the form of the invention shown in Fig. 4 the slot closure door 36 is entirely eliminated and the forward portion of the movable member 18 is changed in such a manner that this member performs the function of the slot closure door 36 illustrated in Figs. 1, 2 and 3. The rearward edge of the relatively fixed leading edge wing portion 10 is also somewhat modified and is provided with a continuous wall member as indicated at 32' curving rearwardly at both the upper and lower surfaces of the member 10. The member 18 is provided with a curved forward extension as indicated at 60 extending forwardly from the pivot 16 and cooperating with the rearwardly projecting lower edge 62 of the member 10 to close the slot 34' when the member 18 is in its uppermost position as shown in dotted lines in Fig. 4. As the member 18 is inclined downwardly the lower forward portion of the extension 60 is separated from the edge 62 to open the bottom of the slot 34' as the upper surface of the member 18 simultaneously separates from the upper edge 30 of the member 10 to open the upper end of the slot 34'. The curvature of the forward portion of the member 18 is preferably so arranged that the bottom end of the slot 34' is opened somewhat more rapidly than the upper end to provide in the wing slot an air confinement ratio sufficient to increase the speed at which the air is projected from the upper end of the slot and rearwardly over the upper surface of the member 18. In the form of the invention shown in Fig. 4 the trailing edge flap 14 is also somewhat modified as indicated at 14' in Fig. 4 and is provided along the forward portion of its upper surface with a spanwise deflector plate 64 which cooperates with the trailing edge 44 of the member 18 to direct a flow energizing blast of air along the upper surface of this flap in all useful positions of inclination of the flap, as is particularly illustrated and described in Patent Number 2,117,607 issued May 17, 1938, to Roger W. Griswold, II. If desired the member 18 may also be provided with a deflector plate similar to the plate 64 to assist in maintaining the streamlined flow over the upper surface of the member 18 at relatively high angles of attack of the wing.

Stated in a somewhat different way, by the arrangement hereinabove described and illustrated in the accompanying drawing, a relatively thin, low-drag moderate-lift wing can be changed, in effect, into three or more relatively thick highly cambered airfoils each disposed successively greater incidence and so positioned as to form well proportioned flow control re-energizing wing slots between each two adjacent airfoils.

While a particular construction and arrangement and two slightly modified forms thereof have been hereinabove described, and illustrated in the accompanying drawing, for the purpose of disclosing the invention, it is to be understood that the invention is in no way limited to the particular construction and arrangement so illustrated and described but that such changes in the size, shape and arrangement of the various parts may be resorted to as come within the scope of the subjoined claims.

Having now described the invention so that others skilled in the art may clearly understand the same, what it is desired to secure by Letters Patent is as follows.

What is claimed is:

1. An airplane wing having a spanwise section convertible from a low drag form of continuous airfoil contour to a high lift form of a plurality of slot energized airfoil members comprising, a relatively fixed forward spanwise portion extending rearwardly approximately one-half the chord length of the wing and constituting the forward portion of said airfoil contour, a movable spanwise extending upper portion immediately to the rear of said relatively fixed portion, said movable portion having a forward wall extending substantially through the thickness of the wing and hinged along its lower edge to said relatively fixed portion, a lower fixed portion underlying said movable portion and spaced from said fixed forward portion, means providing an upwardly and rearwardly directed tapered wing slot immediately in front of said forward wall having as its air entrance opening the space between said fixed wing portions, a spanwise extending door pivotally supported on said fixed forward portion for opening and closing the lower end of said wing slot, and a tiltable trailing edge flap pivotally connected to the rearward portion of said movable wing portion.

2. An airplane wing having normally a chordwise section of continuous airfoil contour comprising, a relatively fixed forward spanwise portion extending rearwardly approximately one-half the chord length of the wing forming the forward part of said airfoil contour, a movable spanwise upper portion immediately to the rear of said relatively fixed forward portion said movable portion having a forward wall extending substantially through the thickness of the wing and hinged along its lower edge to said relatively fixed portion, a lower fixed portion underlying said movable portion, means providing an unwardly and rearwardly directed tapered wing slot immediately in front of said forward wall opening between the adjacent edges of said fixed wing portions, a spanwise door pivotally supported on said fixed forward portion for opening and closing the lower end of said wing slot, a pivotal trailing edge flap pivotally connected to the rearward portion of said movable wing portion, and means carried by said movable wing portion providing an upwardly and rearwardly directed tapered wing slot between the rearward edge of said movable wing portion and the forward upper portion of said flap whenever said movable wing portion is tilted downwardly about said hinge connection.

3. An airfoil comprising a relatively fixed portion having an upper surface and a lower surface, said lower surface having a greater length, chordwise, than said upper surface, and having an opening therein, a relatively movable member normally forming a continuation chordwise of said upper surface hinged to said relatively fixed portion adjacent said opening, means for moving said relatively movable member about said hinge to bring the rear portion thereof adjacent the trailing edge of said lower surface and open a wing slot having an entrance at said opening and an exit adjacent the trailing edge of said upper surface.

4. In an airplane wing convertible from a low drag form of substantially continuous airfoil contour to a high lift form of spaced airfoil portions in which adjacent portions are separated by an intervening airflow slot, a relatively fixed wing portion constituting the forward part of said airfoil contour, a relatively movable upper portion hinged immediately to the rear of said fixed portion and limited to movements substantially wholly within said airfoil contour, a relatively fixed lower portion underlying said movable upper portion, and a tiltable flap disposed to the rear of said fixed wing portion and carried by said movable portion.

5. An airplane wing having normally a chordwise section of substantially continuous airfoil contour comprising, a relatively fixed forward portion constituting the forward part of said airfoil contour, a relatively movable upper portion disposed immediately to the rear of said fixed forward portion and pivotally connected adjacent to its lower forward edge to said fixed portion, a relatively fixed lower wing portion underlying said movable upper wing portion and spaced at its forward edge from the rearward end of said fixed forward portion, said movable upper portion being movable about said pivotal connection to render said fixed portions and said movable portion a complete airfoil of continuous contour, and a tiltable flap of continuous airfoil contour carried by said movable upper portion at its rearward edge.

6. An airplane wing having a spanwise section convertible from a low drag form of substantially continuous airfoil contour to a high lift form of a plurality of slot energized airfoil members comprising, a relatively fixed forward portion forming the forward part of said airfoil contour, a relatively movable upper portion pivotally supported immediately to the rear of said fixed forward portion having a forward wall extending through the depth of the wing section, the rear side of said fixed forward portion being shaped to cooperate with said forward wall to provide a wing slot immediately in front of said forward wall of said relatively movable upper portion when said movable portion is tilted downwardly, a relatively fixed lower portion underlying said movable portion, and a tiltable flap of continuous airfoil contour carried by said movable portion rearwardly of said fixed portion.

7. In an airfoil having a chordwise section convertible from a low drag form of continuous airfoil contour to a high lift form of a plurality of slot energized airfoil members, a relatively fixed portion constituting the forward portion and the greater part of the lower portion of said continuous airfoil contour and having a spanwise opening therethrough, a tiltable upper portion extending rearwardly from said opening to the termination of the lower surface of said fixed portion and spaced at its rearward edge from the rearward edge of said fixed portion, a trailing edge flap extending beyond said fixed and movable portions to complete said airfoil contour, and means for tilting said upper portion to bring the rearward edges of said tiltable portion and said fixed lower portion together to constitute a complete airfoil exclusive of said flap and to simultaneously open a wing slot through the airfoil thus constituted.

8. In an airfoil having a low drag form of substantially continuous airfoil contour, in combination, a main forward portion whose upper and lower surfaces are separated a substantial distance at the rear thereof, a flap positioned adjacent the rear of said main portion to constitute a continuation of said upper and lower surfaces and complete said airfoil contour, means for moving said flap to a position below said airfoil, and means for moving the upper surface of said main portion to bring the rear portion of the upper and lower surfaces of said main portion close together to form a complete airfoil contour exclusive of said flap.

9. A multipartite airfoil having a low drag form of continuous airfoil contour comprising, in combination, a fixed portion whose lower surface has a greater chordwise extent than its upper surface constituting a portion of said airfoil contour, a movable portion forming a portion of the upper surface of said airfoil contour pivoted at its forward edge to said fixed portion and extending rearwardly from the rear of the upper surface of said fixed portion to an extent substantially equal to the excess of the chordwise extent of said fixed lower surface over said fixed upper surface, a pivotally mounted third portion located adjacent the trailing edge of the movable portion to complete said airfoil contour, and means for moving said movable portion to render said fixed and said movable upper surface portions a complete airfoil exclusive of said third portion and to bring said third portion to a position below the rear portion of the airfoil thus constituted.

10. In an airfoil having a low drag form of substantially continuous airfoil contour, in combination, a main portion having a forward part conforming to said airfoil contour, and a flap of airfoil contour at the rear of said main portion completing said contour, the rearward edges of the upper and lower surfaces of said main portion being separated by substantially the thickness of said flap, means pivotally supporting a surface portion of said main portion at a location spaced from the trailing edge of said surface portion, means for moving said flap to a position below said main portion, and means for tilting said surface portion to decrease the space between the rearward edges of the surfaces of said main portion and give to said main portion a complete airfoil contour exclusive of said flap.

11. In an airfoil having a low drag form of substantially continuous airfoil contour, in combination, a main portion having a forward portion conforming to said contour, and a flap of airfoil contour at the rear of said main portion completing said contour, the rearward edges of the upper and lower surfaces of said main portion being separated by substantially the thickness of said flap, means pivotally supporting a surface portion of said main portion at its location spaced from the trailing edge of said surface portion, means for moving said flap to a position below said main portion, means for tilting said surface portion to close the space between the rearward edges of the surfaces of said main portion and render said main portion a complete airfoil of continuous contour exclusive of said flap, and means cooperating with said movable surface portion to provide a wing slot through said main portion when said surface portion is tilted.

12. In an airfoil a flap forming the entire rear portion of said airfoil, and means for moving the upper surface of said airfoil adjacent the leading edge of said flap to a position closer to the lower surface of said airfoil at that location and for simultaneously moving said flap from the position in which it forms the entire rear portion of said airfoil to a position spaced from said lower surface.

13. In an airfoil having a main forward part comprising upper and lower surfaces having a gap between them at their rear edges, a flap forming the entire rear portion of said airfoil, located in said gap and constituting with said main part the entire airfoil, means for closing said gap by reducing the distance between the rear edges of said upper and lower surfaces and for moving said flap to a position spaced from said lower surface.

ROGER W. GRISWOLD, II.